United States Patent
Suzuki (10) Patent No.: US 6,424,247 B2
(45) Date of Patent: Jul. 23, 2002

(54) INVERTER TRANSFORMER

(75) Inventor: Shinichi Suzuki, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 09/795,134

(22) Filed: Mar. 1, 2001

(30) Foreign Application Priority Data

Mar. 22, 2000 (JP) ........................................ 2000-080001

(51) Int. Cl.$^7$ .............................................. H01F 21/00
(52) U.S. Cl. ...................... 336/110; 336/170; 336/173; 323/250; 323/251
(58) Field of Search ............................ 363/64; 323/250, 323/251, 330, 332, 355, 362; 336/173–175, 183–186, 216, 219, 221, 110; 29/602.1, 607

(56) References Cited

U.S. PATENT DOCUMENTS

| | | | |
|---|---|---|---|
| 1,758,820 A | * 5/1930 | Biermanns | .................. 336/182 |
| 2,333,015 A | * 10/1943 | Kramer et al. | ............... 307/149 |
| 3,691,492 A | * 9/1972 | Muller | ........................ 336/184 |

* cited by examiner

Primary Examiner—Adolf Deneke Berhane
Assistant Examiner—Gary L. Laxton
(74) Attorney, Agent, or Firm—Oliff & Berridge, PLC (57) ABSTRACT

In an inverter transformer, since a plurality of secondary windings 2, 2 are wound around a plurality of bar-shaped magnetic cores 3, 3 which are formed independently of each other and electromagnetically coupled to a primary winding 1 with equivalent characteristics, there are obtained a plurality of secondary windings 2, 2 which function independently of each other and are electromagnetically equivalent to each other as well, and an open magnetic circuit structure. It does not happen that the numbers of both the primary and secondary winding increase in proportion to the increase in the number of cold cathode lamps, but only the number of the secondary winding increases while the primary winding is common and does not increase in number.

7 Claims, 8 Drawing Sheets

INVERTER TRANSFORMER

BACKGROUND OF THE INVENTION

1. Field of the Invention

The present invention relates to an inverter transformer suitable for an inverter circuit that turns on a light source for lightening a screen of a liquid crystal display.

2. Description of the Related Art

In recent years, a liquid crystal display (hereinafter referred to as "LCD") has been widely employed as a display device for a personal computer or the like. The LCD requires a light source for lightening a screen, which is called "back light" or the like.

Also, in order to brightly illuminate the screen of the LCD of this type four or more cold-cathode fluorescent lamps (hereinafter referred to as "CFL") may be employed as the above light source and made all to discharge and be lightened at the same time.

In general, in order for the CFL of this type to discharge and be lightened, an inverter circuit is employed which receives a d.c. input voltage of about 12 V and generates a high-frequency voltage of about 60 kHz in frequency and about 1600 V in voltage at a secondary side of the Royer oscillating circuit, namely, at a secondary side of an inverter transformer when starting the discharging operation.

The inverter circuit controls the secondary voltage of the inverter transformer and steps it down to about 600 V necessary to keep the CFL discharging after the CFL has started discharging. The voltage control is conducted usually under PWM (pulse width modulation) control.

Up to now, the inverter transformer for use in the inverter circuit has been available in two types, that is, an open magnetic circuit structure using a bar-shaped core as a magnetic core and a closed magnetic circuit structure.

Figure 9:
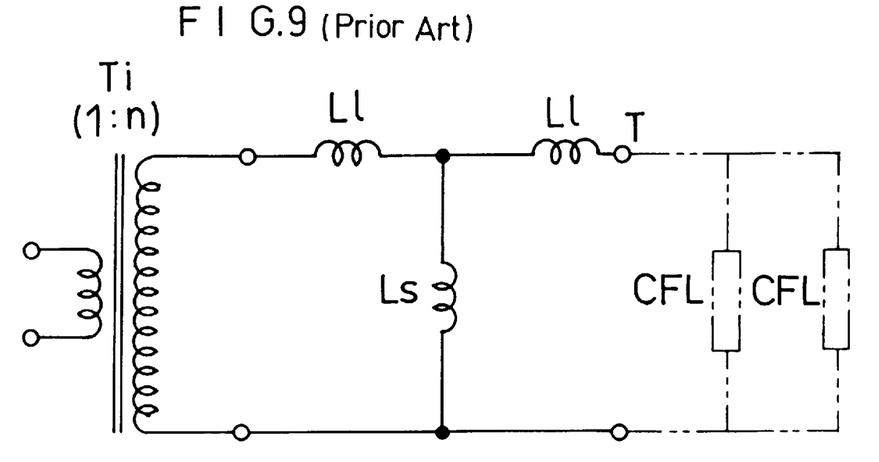
FIG. 9 is a diagram showing an equivalent circuit of a conventional inverter transformer with an open magnetic circuit structure.

FIG. 9 is a circuit diagram showing an equivalent circuit of an inverter transformer with the open magnetic circuit structure.

In the figure, Ti denotes a step-up ideal transformer of 1:n without any loss, L1 denotes a leakage inductance and Ls denotes an inductance of a secondary winding.

In the inverter transformer with the open magnetic circuit structure shown in the figure, when one CFL is connected to the inverter transformer, the leakage inductances L1, L1 serve as a ballast inductance and the CFL normally discharges with only a very slight voltage drop at an inverter transformer output terminal T.

However, when two CFLs are connected to the inverter transformer, if any one of those CFLs first discharges, the voltage at an output terminal T drops and the other CFL cannot discharge, because the leakage inductances L1, L1 are large.

Figure 10:
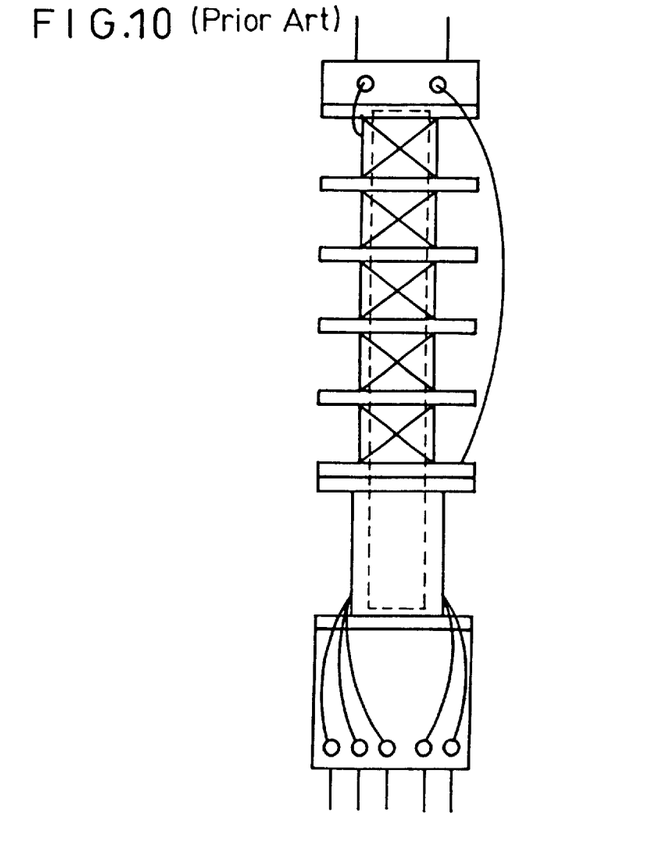
FIG. 10 is a diagram showing a conventional inverter transformer with an open magnetic circuit structure using a bar-shaped core as a magnetic core.

The inverter transformer with the open magnetic circuit structure using a bar-shaped core as a magnetic core is structured, for example, as shown in FIG. 10, accordingly is simple in structure as compared with the inverter transformer with the closed magnetic circuit structure (not shown) where the magnetic core is formed in a closed shape, for example, a square and a winding must be wound around the magnetic core.

However, with the open magnetic circuit structure, it inevitably happens that the CFL cannot discharge as described above, and therefore one inverter transformer is required for each CFL.

Accordingly, if four or more CFLs are employed for lightening a screen brightly as described above, four or more inverter transformers are necessary. For this reason, there arises such a problem that the overall inverter transformer is large-sized, thereby pushing up the costs.

On the other hand, in the inverter transformer where the magnetic core is formed of the closed magnetic circuit structure, two or more CFLs are connected to one inverter transformer so that all the CFLs can discharge.

However, in this event, if any one of those CFLs discharges and the internal impedance of that CFL is lowered whereby a discharge current flows and a load current increases, then the output terminal voltage of the inverter transformer drops although the closed magnetic circuit structure has a small leakage inductance. This may affect discharging conditions of the other CFLs, resulting in a possible variation in the discharging operation of the respective CFLs.

Also, since the impedance of the CFL has a negative resistant characteristic, if one CFL discharges and is lighted, the impedance of the CFL is rapidly reduced so that a current greatly increases. As a result, the inverter transformer may suffer damages, for example, a broken wire of the winding.

Figure 11:
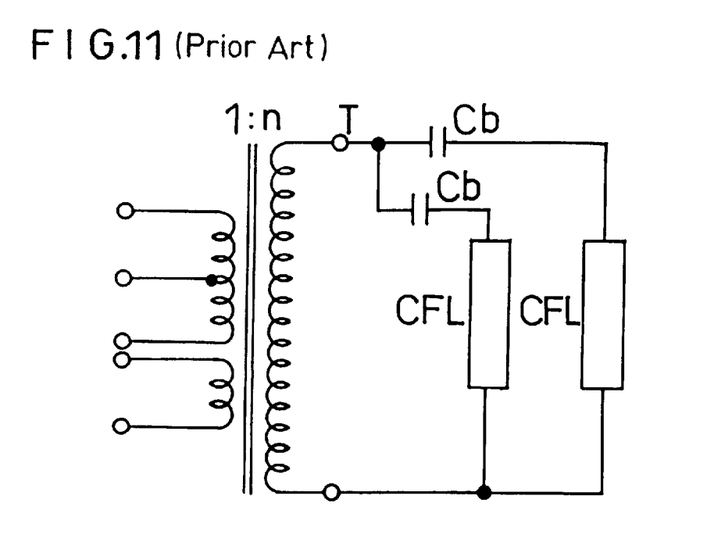
FIG. 11 is a diagram showing a circuit in which ballast capacitors are connected to an inverter transformer with a closed magnetic circuit structure whereby two CFLs can discharge electricity.

In order to solve the problem that a drop of the output terminal voltage of the inverter transformer with the closed magnetic circuit structure adversely affects the discharging conditions of the other CFLs, ballast capacitors Cb, Cb may be inserted between an output terminal T and the respective CFLs as shown in FIG. 11.

However, the insertion of the ballast capacitors Cb,Cb causes a phase difference in voltage and current resulting in remarkable deterioration in power efficiency and also invites increase in the number of parts and cost.

As described above, the conventional inverter transformer with the open magnetic circuit structure suffers such a problem that the number of inverter transformers increases at a ratio of 1:1 to the number of CFLs whereby the inverter transformers are large-sized as a whole and the costs rise.

Also, the conventional inverter transformer with the closed magnetic circuit structure, although one unit enables a plurality of CFLs to discharge, suffers such a problem that a variation in the discharging operation occurs between the respective CFLs and that the inverter transformer is damaged by excessive-current.

Although the ballast capacitors Cb, Cb may be connected in series with the respective CFLs to prevent the variation in the discharging operation between the respective CFLs, this leads to such a new problem that the power efficiency is deteriorated and that the number of parts and the costs increase.

SUMMARY OF THE INVENTION

The present invention has been made in order to provide an inverter transformer with an open magnetic circuit structure, which is free from all of the above problems inherent in a closed magnetic circuit structure and at the same time does not require the number of inverter transformers to increase at a ratio of 1:1 to the number of CFLs thereby downsizing the entire construction as compared with an inverter transformer with a conventional open magnetic circuit structure and preventing an increase in cost.

In order to achieve the above object, according to a first aspect of the present invention, there is provided an inverter transformer, which is provided in an inverter circuit that converts a d.c. voltage into an a.c. voltage and which steps up or down an a.c. voltage inputted to a primary side thereof and outputs a stepped-up or stepped-down voltage to a secondary side thereof, comprising: a plurality of secondary windings; and a primary winding common to the plurality of secondary windings; wherein the respective secondary windings are wound around each of a plurality of bar-shaped magnetic cores, which are formed independently of each other and electromagnetically coupled to the above common primary winding with mutually equivalent characteristics.

According to a second aspect of the present invention, in the first aspect of the present invention, the respective secondary windings are wound around each of the bar-shaped magnetic cores along an axial direction thereof and are divided into a plurality of sections in the axial direction, and an insulating partition plate is disposed respectively between two adjacent sections.

According to a third aspect of the present invention, in the first or second aspect of the present invention, the respective bar-shaped magnetic cores are formed in an L-shape, have the secondary winding wound around one wing of the L-shape, and fixedly positioned relative to the primary winding in such a manner as to be electromagnetically coupled to the primary winding at the entire portion of the other wing of the L-shape.

According to a fourth aspect of the present invention, in any one of the first to third aspects of the present invention, magnetic plates are disposed close to the secondary windings and along the axial direction of the secondary windings in such a manner as to cover both the primary winding and the plurality of secondary windings, or only the plurality of secondary windings.

In the first aspect of the present invention, since the plurality of secondary windings having the mutually equivalent characteristics are provided, and since the primary winding is common to those plural secondary windings, the entire structure is downsized thereby holding down a rise in the costs as compared with the conventional inverter transformer having a plurality (the same number as the secondary) of primary windings as well as secondary windings.

Also, since the open magnetic circuit structure is applied to the present invention, all the problems inherent in the closed magnetic circuit structure can be eliminated such as a variation in the discharging operation between the CFLs connected to the respective secondary windings, a deterioration in the power efficiency caused by adding ballast capacitors, an increase in the number of parts, and the like.

In the second aspect of the present invention, the insulation partition plates disposed respectively between two adjacent sections hold a required creeping distance and prevent creeping discharge.

In the third aspect of the present invention, the bar-shaped magnetic cores with an L-shape, which have the secondary winding wound around one wing of the L-shape, are electromagnetically coupled to the primary winding at the entire portion of the other wings. With this structure, the magnetic flux amount received by the secondary windings from the primary winding is increased as compared with a structure in which the simple bar-shaped magnetic cores are electromagnetically coupled to the primary winding only at the end portions, whereby a higher output can be generated.

In the fourth aspect of the present invention, the value of the leakage inductance can be adjusted in accordance with the arrangement of the magnetic plates which are disposed close to the secondary windings in such a manner as to cover both the primary winding and the plurality of secondary windings, or only the plurality of secondary windings.

BRIEF DESCRIPTION OF THE DRAWINGS

These and other objects, features and advantages of this invention will become more fully apparent from the following detailed description taken with the accompanying drawings in which.

DESCRIPTION OF THE PREFERRED EMBODIMENTS

Now, a description will be given in more detail of preferred embodiments of the present invention with reference to the accompanying drawings.

Figure 1:
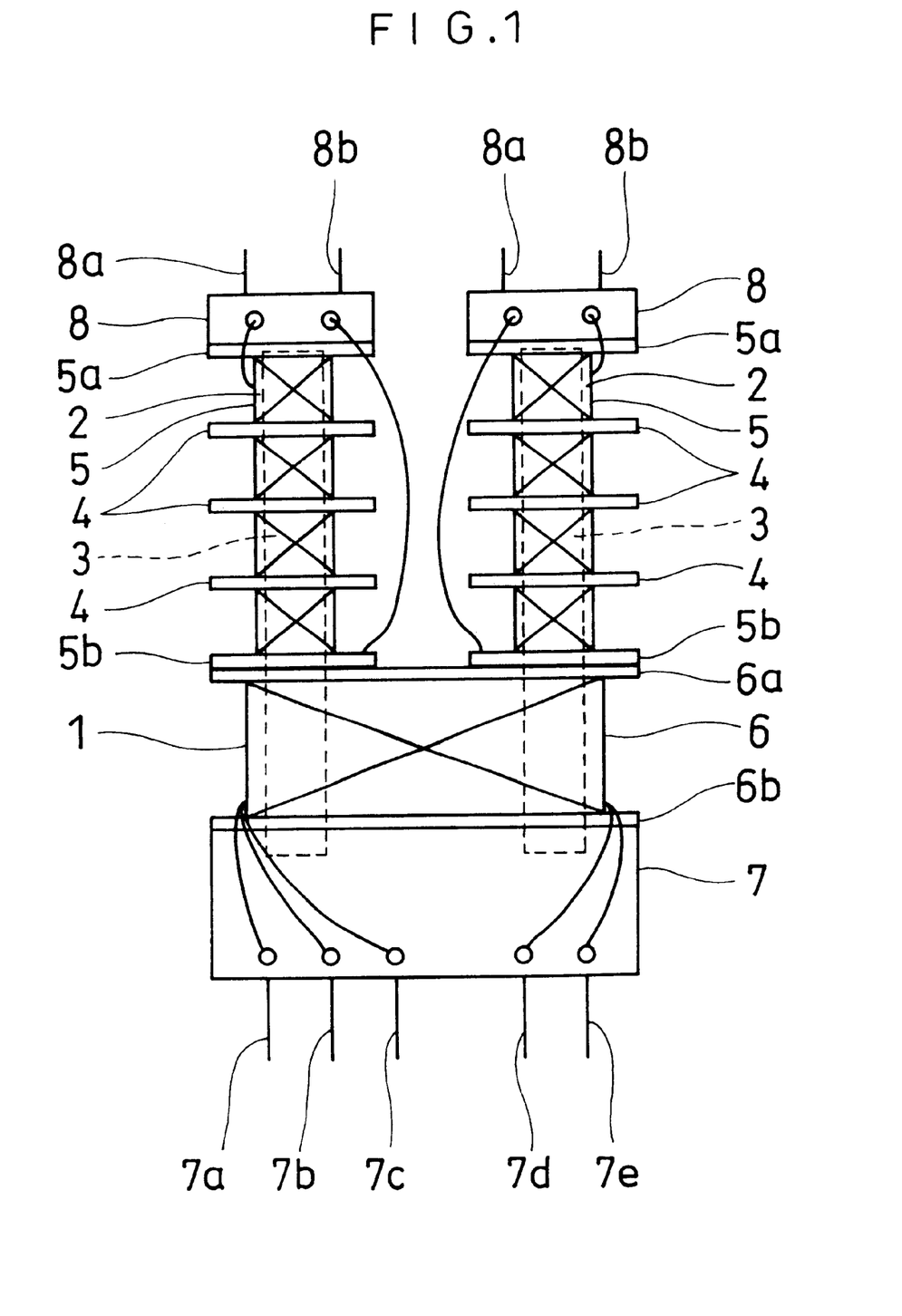
FIG. 1 is a diagram showing an entire structure of an inverter transformer in accordance with one embodiment of the present invention.

FIG. 1 is a diagram showing the entire structure of an inverter transformer in accordance with one embodiment of the present invention. The inverter transformer according to the present invention has an open magnetic circuit structure, as will be described later, in which a bar-shaped magnetic core is used and a secondary winding is wound around the bar-shaped magnetic core.

In FIG. 1, reference numeral 1 denotes a primary winding, and 2 a secondary winding. A plurality of secondary windings 2, 2, two in this example, are electromagnetically coupled to the primary winding 1 which serves as a common primary winding, respectively.

That is, the respective secondary windings 2 are separately wound around bar-shaped magnetic cores 3, 3 made of ferrite which is a soft magnetic material, or the like and arranged in parallel to each other. Those bar-shaped magnetic cores 3, 3 are electromagnetically coupled to the common primary winding 1.

In this example, the respective bar-shaped magnetic cores 3, 3 are formed independently and electromagnetically coupled to the primary winding 1 with mutually equivalent characteristics. Accordingly, the respective secondary windings 2, 2 also function independently of each other and are electromagnetically equivalent to each other.

In this example, the above secondary windings 2, 2 are wound around the bar-shaped magnetic cores 3, 3 along an axial direction thereof. Because a high voltage is generated, those bar-shaped magnetic cores 3, 3 are divided into a plurality of sections in the axial direction, and an insulating partition plate 4 is disposed, respectively, between adjacent sections so that a creeping distance necessary for prevention of creeping discharge is held.

Actually, each of the secondary windings 2, 2 is wound on the outer periphery of a cylindrical bobbin 5, and each of the bar-shaped magnetic core 3, 3 is inserted into the bobbin 5. The primary winding 1 is also wound on a cylindrical bobbin (primary winding bobbin) 6, and the primary winding bobbin 6 is formed with an inner diameter which can accommodate the lower end portions of the bar-shaped magnetic cores 3, 3 in the figure. Also, both end surfaces of the respective bobbins 5 and 6 are provided with flanges 5a, 5b; 6a, 6b.

The bar-shaped magnetic cores 3, 3 are fixedly positioned at respective places inside the primary winding bobbin 6 which are electromagnetically equivalent to each other so that the bar-shaped magnetic cores 3, 3 are electromagnetically coupled to the primary winding 1 with the mutually equivalent characteristics. The other portion of each of the bar-shaped magnetic cores 3, 3 than the portion positioned inside the primary winding bobbin 6 is positioned inside each of the secondary winding bobbins 5, 5 on which the respective secondary windings 2, 2 are wound.

With the above structure, the electromagnetic coupling of the secondary windings 2, 2 to the primary winding 1 as described above is realized, and the respective secondary windings 2, 2 are electromagnetically equivalent to each other.

Starting and finishing ends of the primary winding 1 plus a feed back winding are connected to terminal pins 7a to 7e which are fixedly supported by a primary winding terminal block 7. Also staring and finishing ends of the respective secondary windings 2, 2 are connected to terminal pins 8a and 8b which are fixedly supported by respective secondary winding terminal blocks 8, 8.

The terminal blocks 7 and 8, 8 are made of an insulating material and fixedly positioned farthest away from each other with the primary and secondary winding bobbins 5, 5 and 6 interposing therebetween.

Figure 2:
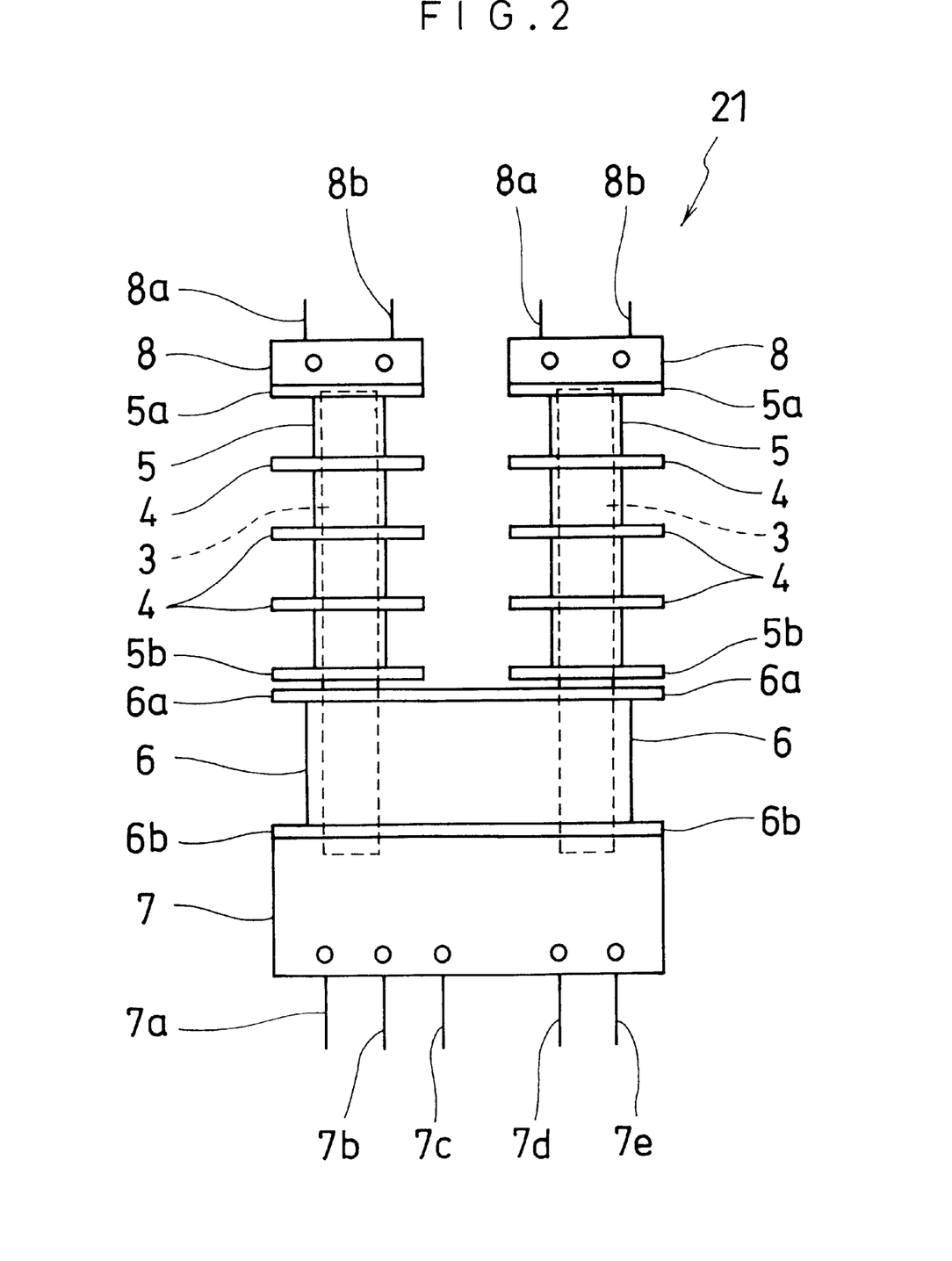
FIG. 2 is a diagram showing a winding accommodation substrate of the inverter transformer shown in FIG. 1.
Figure 3:
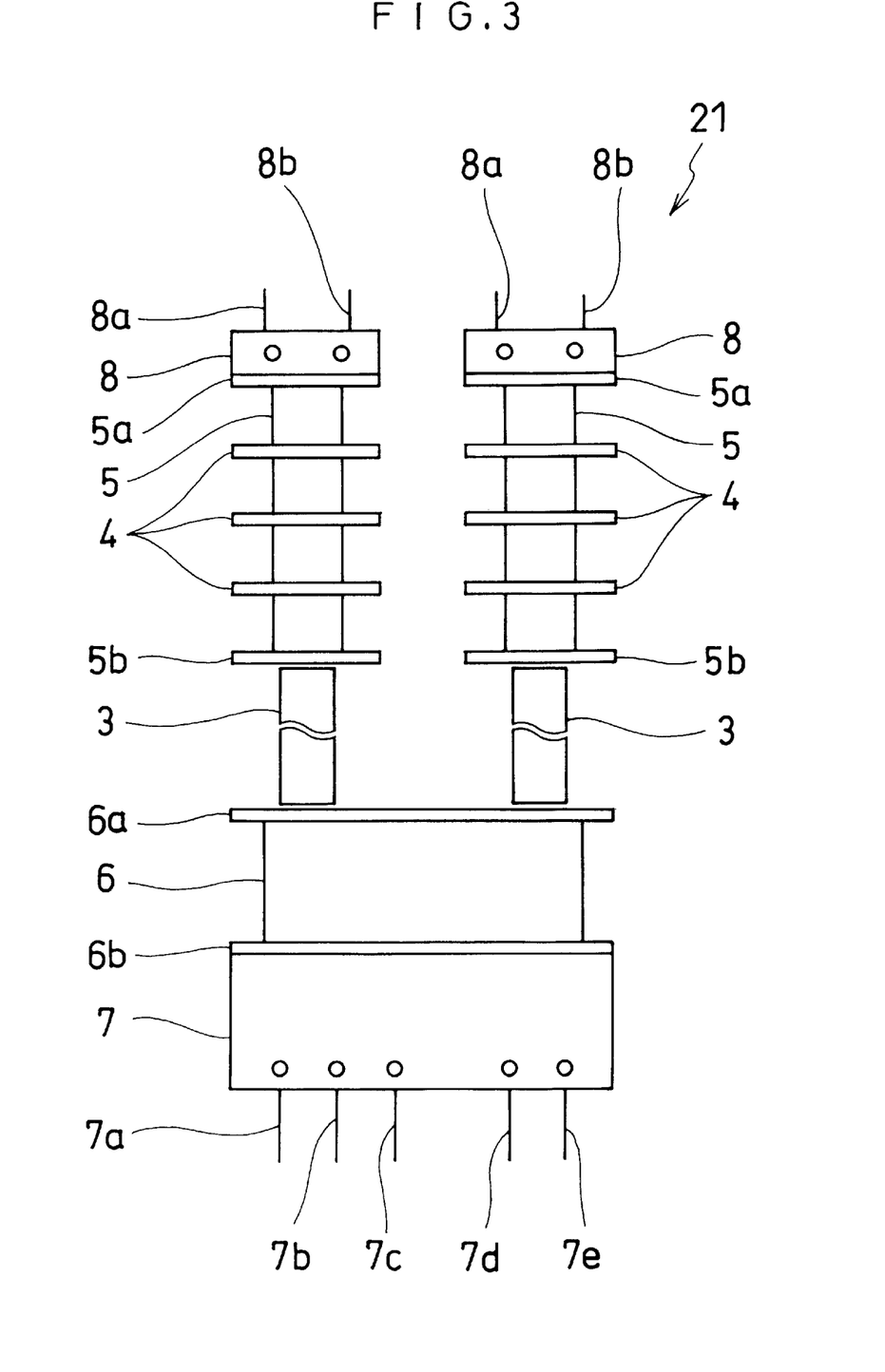
FIG. 3 is an exploded diagram of FIG. 2.

FIG. 2 is a diagram showing the inverter transformer according to the present invention shown in FIG. 1, removing the primary winding 1 and the secondary windings 2, 2 (winding accommodation substrate 21), and FIG. 3 is an exploded view of FIG. 2. In FIGS. 2 and 3, the same references as those in FIG. 1 designate identical parts.

The respective windings 1 and 2, 2 are provided on the winding accommodation substrate 21 as shown in FIG. 1.

Figure 4:
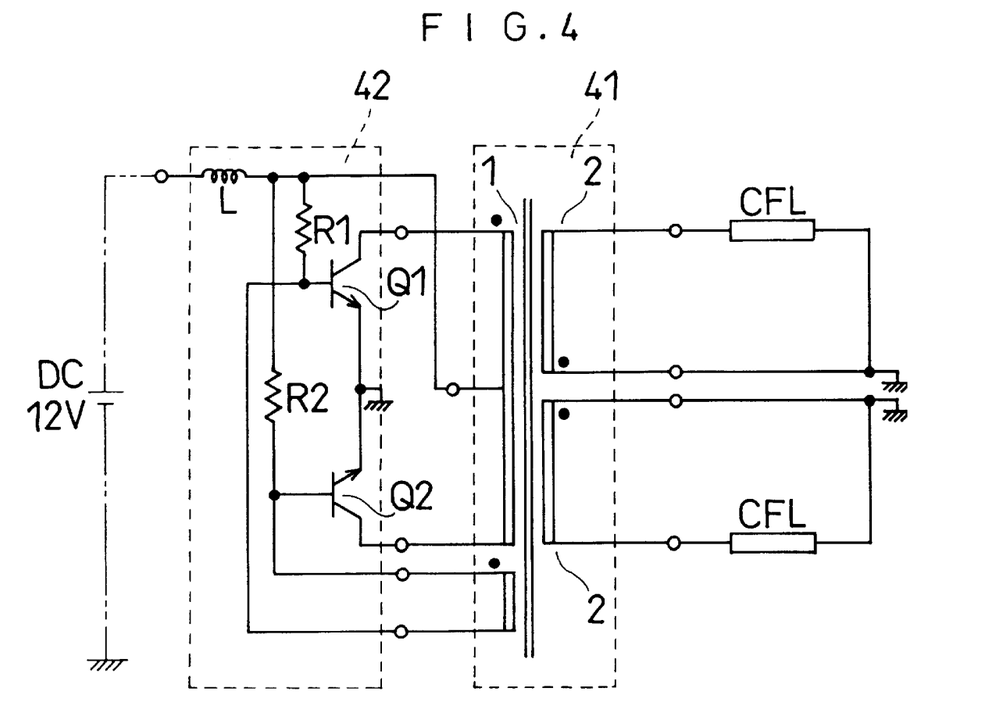
FIG. 4 is a diagram showing an example of a circuit in which CFLs are connected to the inverter transformer shown in FIG. 1.

FIG. 4 shows an example of a circuit in which CFLs (loads) are connected to the above-described inverter transformer of the present invention.

In FIG. 4, the inverter transformer 41 of the present invention, in association with a switching circuit 42, constitutes an inverter circuit. With this structure, the inverter transformer 41 steps up a high-frequency voltage which is applied to the common primary winding 1 and applies the stepped-up voltage to two CFLs connected to the secondary windings 2, 2 thereby making the CFLs discharge and lighten.

In FIG. 4, L is an inductance, R1 and R2 are resistors, and Q1 and Q2 are transistors, and those components constitute the above switching circuit 42.

Figure 5:
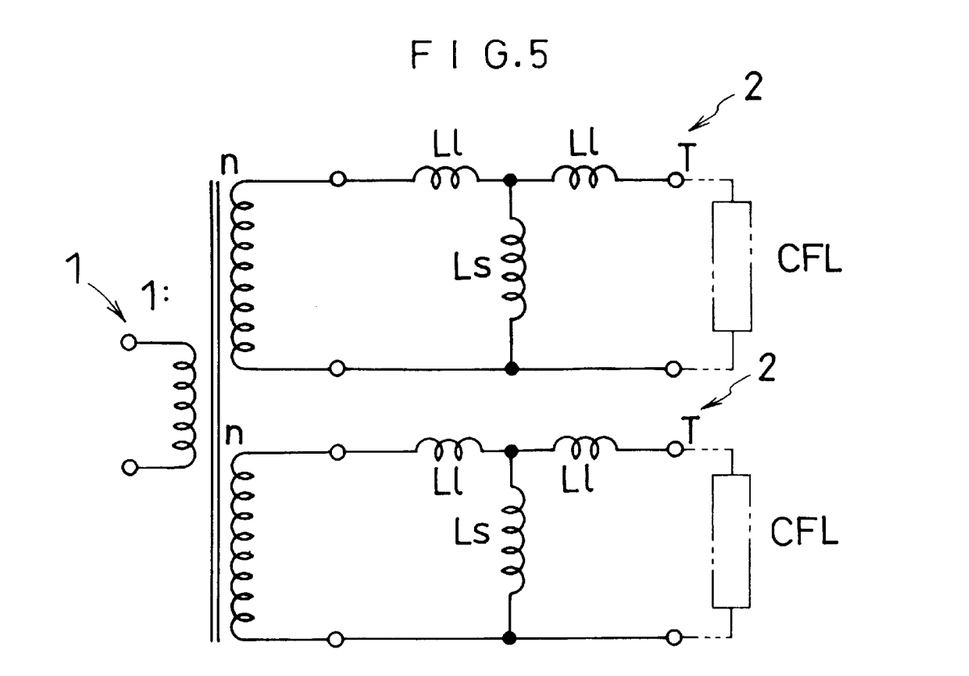
FIG. 5 is a diagram showing an equivalent circuit of the inverter transformer shown in FIG. 4.

FIG. 5 is a diagram showing an equivalent circuit of the inverter transformer 41 shown in FIG. 4. In FIG. 5, the same references as those in FIG. 9 denote identical or equivalent parts.

According to the inverter transformer 41 of the present invention provided in the inverter circuit as shown in FIG. 4, as seen from the equivalent circuit shown in FIG. 5, the respective secondary windings 2, 2 have the primary winding 1 in common but are independent of each other and electromagnetically equivalent to each other. That is, the circuit structure is such that the respective CFLs are connected through individual leakage inductances L1, L1 (secondary windings 2, 2).

Accordingly, even if any one of the CFLs first discharges, the output voltage (voltage at the output terminal T) of the other secondary winding 2 does not drop (one CFL does not adversely affect the discharging condition of the other CFL). In other words, after one CFL discharges and lightens, the other CFL can normally discharge and lighten without using ballast capacitors Cb, Cb (refer to FIG. 11).

In the above embodiment, description was given of a case where two secondary windings 2, 2 are provided, but the present invention is not limited to this structures and is applicable to a structure in which three or more secondary windings may be disposed and a CFL may be connected to each of those secondary windings.

Figure 6:
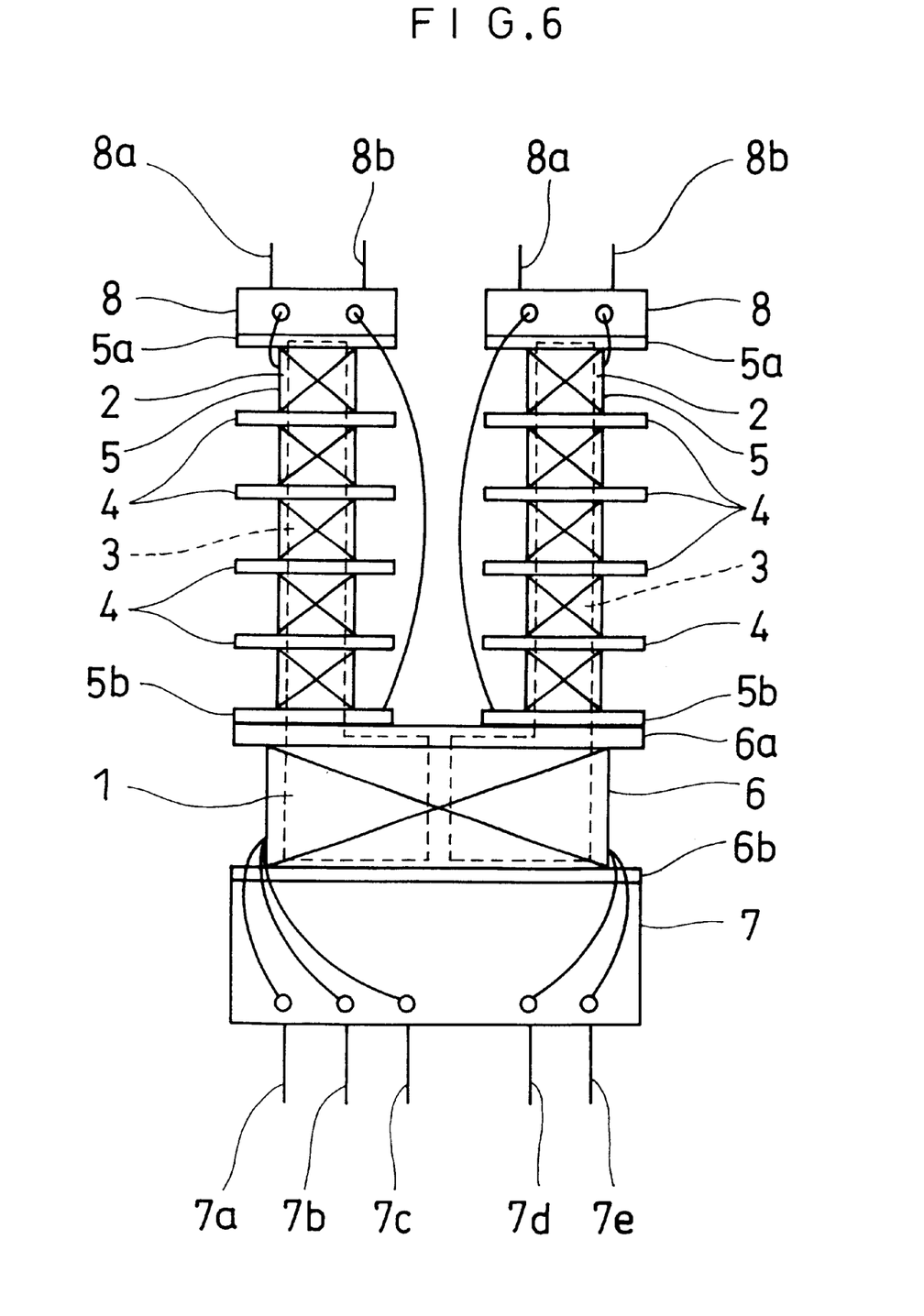
FIG. 6 is a diagram,showing an entire structure of an inverter transformer in accordance with another embodiment of the present invention.

Also, in the above embodiment, the respective bar-shaped magnetic cores 3, 3 are formed in a simple bar shape (I-shape), but may be formed, for example, in an L-shape as shown in FIG. 6. In this case, each of the secondary windings 2, 2 is wound around one wing (vertical wing) of the L-shape and the respective L-shaped magnetic cores 3, 3 are fixedly positioned relative to the primary winding 1 in such a manner that the respective end faces of the other wings (horizontal wings) of the L-shaped magnetic cores 3, 3 oppose each other so that the whole of each of the other wings is electromagnetically coupled to the primary winding 1.

With this structure, the magnetic flux amount received by the secondary windings 2, 2 from the primary winding 1 is increased to thereby generate a higher output as compared with a case where only the end portion of each of the simple bar-shaped magnetic cores 3, 3 is electromagnetically coupled to the primary winding 1 as shown in FIG. 1.

In addition, in the above-described embodiment, the electromagnetic coupling of the respective bar-shaped magnetic cores 3, 3 (secondary windings 2, 2) to the primary winding 1 is carried out by placing the lower end portions of the respective bar-shaped magnetic cores 3, 3 inside the primary winding bobbin 6. However, the present invention is not limited to this structure.

Figure 7:
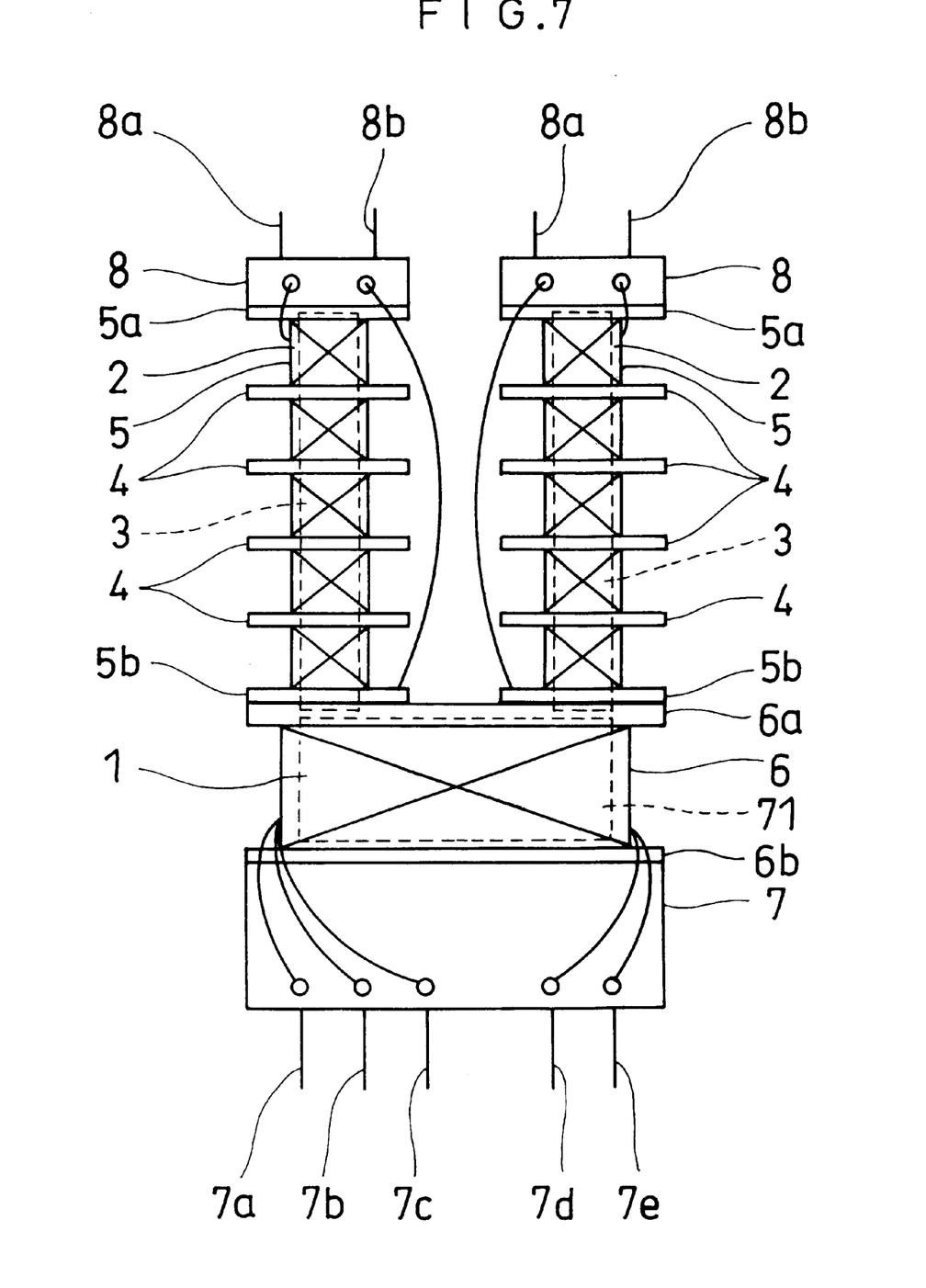
FIG. 7 is a diagram showing an entire structure of an inverter transformer in accordance with still another embodiment of the present invention.

For example, as shown in FIG. 7, a secondary magnetic core 71 may be placed inside the primary winding bobbin 6, wherein the lower end faces of the respective bar-shaped magnetic cores 3, 3 oppose the upper end face of the secondary magnetic core 71, to thereby conduct the above electromagnetic coupling.

Also, the sectional (cross-sectional) configuration of the bar-shaped magnetic cores 3, 3 is not limited to a specific shape such as circle, but may be arbitrary, for example, rectangle or ellipse, only if the bar-shaped magnetic cores 3, 3 can be inserted into the bobbin 5. Generally, the sectional configuration of the bar-shaped magnetic cores 3, 3 is identical with the sectional configuration of the portion of the bobbin 5, into which the magnetic cores are inserted.

Figure 8:
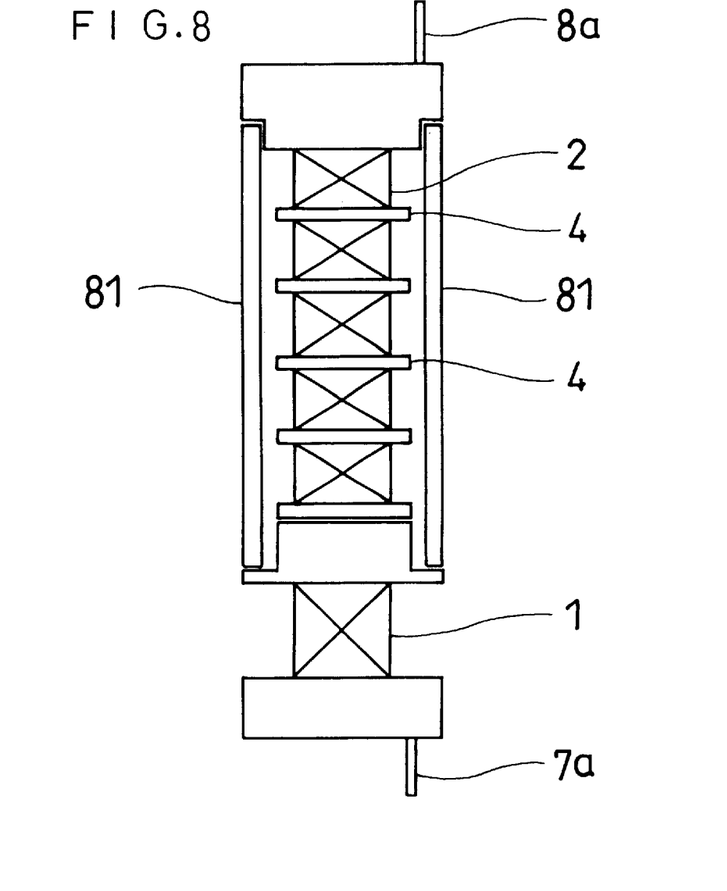
FIG. 8 is a diagram showing an entire structure of an inverter transformer in accordance with yet still another embodiment of the present invention.

Still further, as exemplified in FIG. 8, two magnetic plates 81, 81 made of ferrite or the like may be disposed close to and along the winding axial direction (vertically in the figure) of the secondary windings 2, 2 in such a manner as to cover the secondary windings 2, 2.

With this structure, the provision of the magnetic plates 81, 81 in the vicinity of the secondary windings 2, 2 makes it possible to adjust the value of the leakage inductance L1, thereby enabling adjustment of the discharging conditions of the CFL.

FIG. 8 is a view seen from the left of FIG. 1 and shows a case where a pair of magnetic plates 81, 81 are so disposed as to cover the front and rear sides of the secondary windings 2, 2, but the magnetic plates 81 may be so structured as to further cover the right and left sides (both side surfaces) of the secondary windings 2, 2. In this case, the interval of the secondary windings 2, 2 and other conditions are set such that the provision of the magnetic plates 81, 81 works to prevent high-voltage leakage from the secondary windings 2, 2.

Also, the magnetic plates 81, 81 may be so structured as to cover not only the secondary windings 2, 2 but also the primary winding 1. In this case, since the primary winding 1 and the secondary windings 2, 2 are adapted to be tightly coupled to each other, an area of the primary winding 1 covered with the magnetic plates 81, 81 and other conditions are so set as to prevent the leakage inductance L1 from being extremely reduced to adversely affect the discharging operation of the CFLs.

The section of the magnetic plates 81, 81 may be arbitrarily configured unless the function by the magnetic plates 81, 81 of adjusting the value of the leakage inductance L1 is lost.

As was described above, according to the present invention, in an inverter transformer to which a plurality of loads such as CFLs are connected, there are provided a plurality of bar-shaped magnetic cores which are formed independently and electromagnetically coupled to a common primary winding with mutually equivalent characteristics. Then, the respective secondary windings are wound around the plurality of bar-shaped magnetic cores, whereby a plurality of secondary windings are obtained which can function independently of each other and are electromagnetically equivalent to each other, and a plurality of loads are connected to the plurality of secondary windings, respectively.

With this structure, the inverter transformer that makes a plurality of loads operate without adversely affecting each other can be obtained without the number of inverter transformers increasing at a ratio of 1:1 to the number of loads, so the entire structure is smaller in size and lower in cost than the conventional open magnetic circuit structure.

Also, since the inverter transformer according to the present invention employs the open magnetic circuit structure in which the secondary windings are wound around the bar-shaped magnetic cores, there can be eliminated all the problems inherent in the closed magnetic circuit structure such as a variation of the discharging operation between the loads connected to the respective secondary windings, and also a deterioration in the power efficiency and an increase in the number of parts both caused by adding ballast capacitors.

The foregoing description of the preferred embodiments of the invention has been presented for the purpose of illustration and explanation. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An inverter transformer, which is provided in an inverter circuit that converts a d.c. voltage into an a.c. voltage and which steps up or down an a.c. voltage inputted to a primary side thereof and outputs a stepped-up or stepped-down voltage to a secondary side thereof, comprising: a plurality of secondary windings; and a primary winding common to the plurality of second windings; wherein the respective secondary windings are wound around a plurality of bar-shaped magnetic cores, respectively, which are formed independently of each other and electromagnetically coupled to the common primary winding with mutually equivalent characteristics.

2. The inverter transformer as claimed in claim 1, wherein the secondary windings are wound around the respective bar-shaped magnetic cores along an axial direction thereof and are divided into a plurality of sections in the axial direction, and an insulating partition plate is disposed respectively between two adjacent sections.

3. The inverter transformer as claimed in claim 1, wherein the respective bar-shaped magnetic cores are formed in an L-shape, have the secondary windings wound around one wing of each of the L-shape, and fixedly positioned relative to the primary winding in such a manner as to be electromagnetically coupled to the primary winding at the entire portion of other wing of the L-shape.

4. The inverter transformer as claimed in claim 1, wherein magnetic plates are disposed close to the secondary windings along the winding axial direction in such a manner as to cover both the primary winding and the plurality of secondary windings, or only the plurality of secondary windings.

5. The inverter transformer as claimed in claim 2, wherein the respective bar-shaped magnetic cores are formed in an L-shape, have the secondary windings wound around one wing of each of the L-shape, and fixedly positioned relative to the primary winding in such a manner as to be electromagnetically coupled to the primary winding at the entire portion of other wing of the L-shape.

6. The inverter transformer as claimed in claim 2, wherein magnetic plates are disposed close to the secondary windings along the winding axial direction in such a manner as to cover both the primary winding and the plurality of secondary windings, or only the plurality of secondary windings.

7. The inverter transformer as claimed in claim 3, wherein magnetic plates are disposed close to the secondary windings along the winding axial direction in such a manner as to cover both the primary winding and the plurality of secondary windings, or only the plurality of secondary windings.

* * * * *